United States Patent [19]
Graham

[11] Patent Number: 5,076,998
[45] Date of Patent: Dec. 31, 1991

[54] MONITORING OF LOW FREQUENCY PULSE RATE

[75] Inventor: Kingsley F. Graham, Murrysville, Pa.

[73] Assignee: Westinghouse Electric Corp., Pittsburgh, Pa.

[21] Appl. No.: 541,430

[22] Filed: Jun. 21, 1990

[51] Int. Cl.$^5$ .............................................. G21C 17/00
[52] U.S. Cl. ..................................... 376/254; 376/255; 376/245
[58] Field of Search ......................... 376/245, 254, 255

[56] References Cited

U.S. PATENT DOCUMENTS

| | | | |
|---|---|---|---|
| 2,982,473 | 5/1961 | Goertzel | 235/197 |
| 3,312,813 | 4/1967 | Vincent et al. | 235/152 |
| 3,424,653 | 1/1969 | Cohn | 176/22 |
| 3,931,522 | 1/1976 | Rusch | 250/390 |
| 4,582,672 | 4/1986 | Tuley, Jr. et al. | 376/254 |
| 4,671,919 | 6/1987 | Gaussa, Jr. et al. | 376/254 |

Primary Examiner—Brooks H. Hunt
Assistant Examiner—Chrisman D. Carroll

[57] ABSTRACT

A method and device for monitoring the power output of a nuclear reactor in the low power range, by detecting neutrons produced by the reactor and producing a representation of the number of neutrons detected during each of a succession of equal measuring intervals; and producing a power output level indication having a value associated with each measuring interval by a digital operation in which the indication value associated with a preceding time interval is altered according to a function of the representation produced during the detecting step for the present measuring interval.

14 Claims, 1 Drawing Sheet

MONITORING OF LOW FREQUENCY PULSE RATE

BACKGROUND OF THE INVENTION

The present invention relates to the monitoring of low frequency events, and particularly monitoring of reactor power at low levels by counting individual detector pulses produced by neutron activity The power output of a nuclear reactor is typically monitored down to a level of $10^{-10}$ – $10^{-5}\%$ of full power, and in the lowest part of this range neutron count rate is employed as a measure of reactor power output.

The traditional technique for developing an indication of average neutron count rate, for example in nuclear reactor instrumentation, is analog in nature and uses a series of charge pumps and first order lag filters to provide a representation approximating the log of the average neutron count rate. Although this technique inherently provides a count rate indication having a low accuracy, it does provide readings which allow an experienced operation to have a good feel for the power level of the neutron source.

More recently, a digital technique offering higher accuracy has been proposed. This technique uses a variable width rectangular window FIR filter and is described in U.S. Pat. No. 4,670,891. This technique results in a very slow response at low counting rates. Moreover, it can create confusing readings during reactor starting and does not provide the type of smooth response which is offered by the older analog techniques.

The digital technique previously proposed is quite effective at the upper part of the range in which neutron count rate is employed or when the count rate is changing relatively slowly. However, count rate changes occurring in the low count rate range can produce erroneous readings. This can be objectionable, in general because it is important that operators be informed of count rate changes, and in particular during reactor startup.

SUMMARY OF THE INVENTION

It is an object of the present invention to produce an accurate indication of neutron count rate using digital techniques.

Another object of the invention is to respond to count rate variations in a manner which minimizes spurious variations due, for example, to noise.

A further object of the invention is to produce power level magnitude and rate of change indications which correspond closely to the actual condition being monitored without requiring any additional detecting devices.

The above and other objects are achieved, according to the present invention, by a method for monitoring the power output of a nuclear reactor in the low power range, comprising:

detecting neutrons produced by the reactor and producing, at the end of each of a succession of equal measuring intervals, a representation of the number of neutrons detected during a time period preceding the end of the respective measuring interval; and producing a power output level indication having a value associated with each measuring interval by a digital operation in which the value associated with a preceding time interval is altered according to a function of the representation produced during the detecting step for the present measuring interval.

By this procedure, the power output level indication can be updated at the end of each measuring interval. However, large fluctuations in the rate of neutron production, which occur at low power level and do not correspond to the actual power level, are effectively filtered out so that the resulting indication is a more accurate representation of the actual power level.

According to a further feature of the invention, the further method additionally includes generating a reactor power output level rate of change indication having a value associated with each measuring interval by: deriving, during each measuring interval, a power level change representation having a value which is a function of the difference between the values of the power output level indications associated with the present measuring interval and with a preceding measuring interval; and producing a reactor power output level rate of change indication having a value associated with each measuring interval by modifying the rate of change indication value associated with a preceding measuring interval according to a function of the power level change representation value associated with the present measuring interval.

The invention could be applied to monitor other conditions which can produce low frequency pulses at a rate which is dependent on the magnitude of the condition.

DESCRIPTION OF THE PREFERRED EMBODIMENTS

Figure 1:
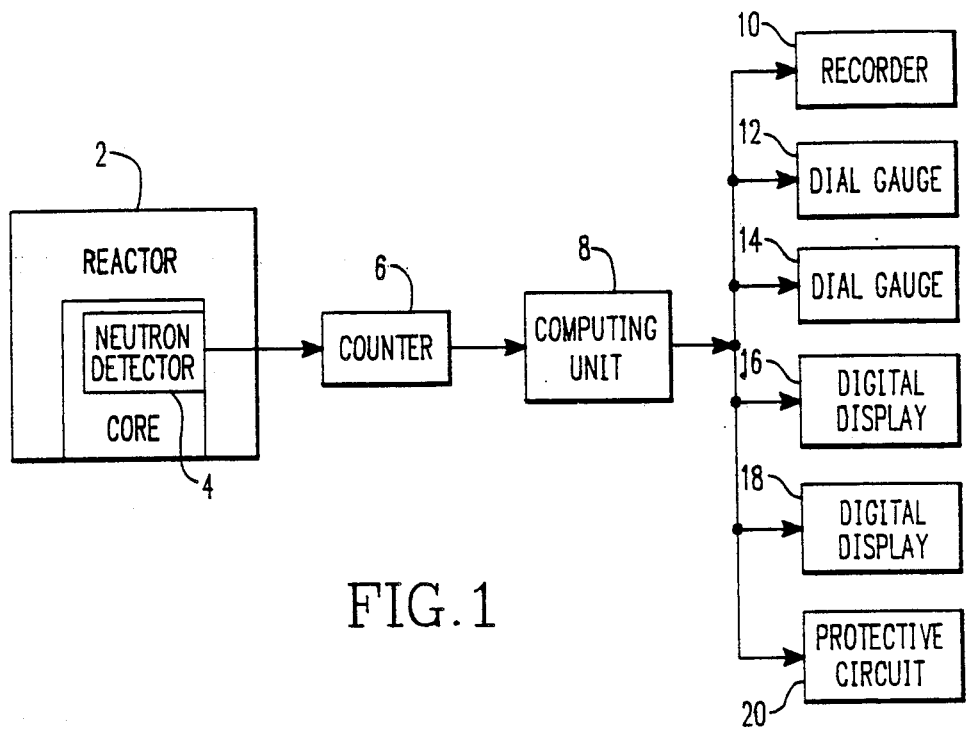
FIG. 1 is a block diagram of a system employing monitoring apparatus according to the invention.

The system shown in FIG. 1 includes a reactor 2 having a core which contains a neutron detector 4. Detector 4 responds to neutron activity in the core by producing a train of pulses at a rate representative of the level of neutron activity, which is proportional to the reactor power output.

The pulse train from detector 4 is delivered to a counter 6 which counts the pulses during successive uniform time intervals T and delivers, at the end of each interval, a representation of the count occurring during that interval.

The successive representations produced by counter 6 are supplied to a computing unit 8 which derives power level and rate of change indications. These indications may be supplied to a recorder 10, such as a strip chart, dial gauges 12 and 14, digital displays 16 and 18, and a circuit 20 provided to shut down reactor 2 if an excessive count rate is detected.

According to the invention, the count rate signal which provides an indication of the reactor power level is in the form of a first order lag, infinite impulse response digital filter. Specifically, referring to FIG. 2, the signal supplied by counter 6 at the end of each interval, i, is, as provided by function block 30:

$$CR_i = \frac{\text{Number of counts during interval } j}{\text{Duration of interval } j},$$

where j=ni, and n is a positive integer

Counter 6 may be constituted by an apparatus as disclosed in U.S. Pat. No. 4,670,891, which is, in effect, a counter having a variable window. In the apparatus disclosed in that patent, the value for CR is updated at the end of each interval i, but the value of CR is determined by the total number of counts appearing during the previous ni (=j) intervals.

The power level indication produced by unit 8 is represented by:

$$CR_{if} = CR_{(i-1)f} + (CR_i - CR_{(i-1)f}) \cdot F,$$

where:
$CR_{if}$ is the count rate resulting from digital filtering;
$CR_{(i-1)f}$ is the filtered count rate derived during the preceding time interval; and
F is a selected filter factor that controls the response to changes in CR.

$CR_{if}$ is derived by subtracting $CR_{(i-1)f}$ from $CR_i$ in function block 32, multiplying the difference by F in function block 34 and adding the resulting product to $CR_{(i-1)f}$ in function block 36. The output from block 36 represents $CR_{if}$ and this output is delayed by T in function block 38 to provide a new value for $CR_{(i-1)f}$. The time T corresponds to the duration of interval i.

The filter factor F is related to the time constant $\tau$ of the filter as follows:

$$F = \frac{T}{\tau + T}$$

Generally, T may be of the order of 0.1 sec. but could have a value of between 0.025 and 0.25 sec., and $\tau$ may be fixed or variable.

Preferably, $\tau$ is variable and has an inverse relationship to the present count rate. In this way, it is possible to provide a rapid response at high count rates and to filter out higher noise levels occurring at low count rates.

Thus, $\tau$ may have the following form:

$$\tau = \frac{K}{CR_i + CR_{(i-1)f}},$$

$\tau$ preferably varies between 0.2 and 8 seconds. The value for constant K is selected to establish the desired relation between $\tau$ and CR.

Figure 2:
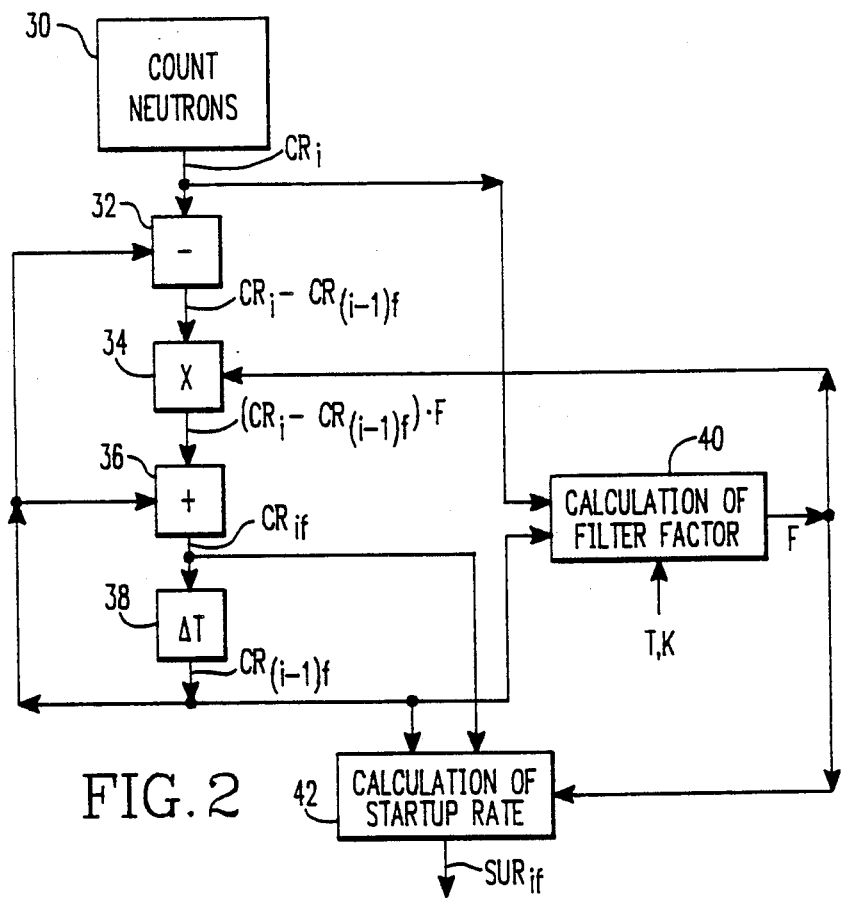
FIG. 2 is a flow diagram illustrating the generation of power level and rate of change indications according to the invention.

In FIG. 2, F is derived in function block 40, based on $CR_{if}$, $CR_{(i-1)f}$ and separately inputted values for T and K.

In further accordance with the invention, a power rate of change indication is derived from the filtered count rate values, $CR_f$, which indication is particularly valuable during reactor startup.

Since the rate of change can vary during startup over a large range, the rate indication is based on the log of the $CR_f$ values. First, at the end of each time interval, an initial rate value, known as a startup rate value, $SUR_i$, is calculated as follows:

$$SUR_i = 60 \cdot \left( \frac{\log_{10}(CR_{if}) - \log_{10}(CR_{(i-1)f})}{T} \right)$$

The factor of 60 produces a value in units of decades/minute.

There is then derived a filtered startup rate procedures similar to that described above. Specifically, the first filter procedure may be $$SUR_{if} = SUR_{(i-1)f} + (SUR_i - SUR_{(i-1)f}) \cdot F,$$

where F has the value described above. The next filtering would use the same relation, substituting $SUR_{if}$ for $SUR_i$.

Preferably, two such filterings are employed to account for the inherently noisy nature of $SUR_i$. One filtering may be effected with a fixed time constant, the other with a variable time constant having the same value as that employed to obtain the power level indication. These operations are performed in function block 42 of FIG. 2, which may contain, for each filtering, a set of blocks corresponding to blocks 32–38.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

I claim:

1. A method for monitoring the power output of a nuclear reactor int he low power range, comprising:
   detecting neutrons produced by the reactor and producing, at the end of each of a succession of equal measuring intervals, a representation of the number of neutrons detected during a time period preceding the end of the respective measuring interval; and
   producing a power output level indication having a value associated with each measuring interval by a digital operation in which the indication value associated with a preceding measuring interval is altered according to a function of the representation produced during said detecting step for the present measuring interval,
   wherein said step of producing a power output level indication comprises: determining the difference between the value of the representation produced for the present measuring interval and the value of the power output level indication associated with a preceding measuring interval; providing a selected multiplying factor having a value less than unity; forming a representation of the value of the product of the difference determined in said determining step and the selected multiplying factor; and adding the product value representation to the power output level indication associated with the preceding measuring interval in order to produce the power output level indication associated with the present invention.

2. A method as defined in claim 1 wherein said step of providing a selected multiplying factor comprises giving the multiplying factor a value inversely proportional to at least the value of the power output level indication associated with a preceding measuring interval.

3. A method as defined in claim 2 wherein the value of the multiplying factor is inversely proportional to the sum of value of the power output level indication associated with the proceeding measuring interval and the value of the representation produced for the present measuring interval.

4. A method as defined in claim 3 further comprising generating a reactor power output level rate of change indication having a value associated with each measuring interval by: deriving, during each measuring interval, a power level change representation having a value which is a function of the difference between the values of the power output level indications associated with the present measuring interval and with a preceding measuring interval; and producing a reactor power output level rate of change indication having a value associated with each measuring interval by modifying the rate of change indication value associated with a preceding measuring interval according to a function of the power level change representation value associated with the present measuring interval.

5. A method as defined in claim 5 wherein the function of the difference in said deriving step is the difference between the logs of the values of the power output level indications, divided by the duration of one measuring interval.

6. A method as defined in claim 1 further comprising generating a reactor power output level rate of change indication having a value associated with each measuring interval by: deriving, during each measuring interval, a power level change representation having a value which is a function of the difference between the values of the power output level indications associated with the present measuring interval and with a preceding measuring interval; and producing a reactor power output level rate of change indication having a value associated with each measuring interval by modifying the rate of change indication value associated with a preceding measuring interval according to a function of the power level change representation value associated with the present measuring interval.

7. A method as defined in claim 6 wherein the function of the difference in said deriving step is the difference between the logs of the values of the power output level indications, divided by the duration of one measuring interval.

8. A device for monitoring the power output of a nuclear reactor in the low power range, comprising:
   detecting means for detecting neutrons produced by the reactor and producing, at the end of each of a succession of equal measuring intervals, a representation of the number of neutrons detected during a time period preceding the end of the respective measuring interval; and
   digital means connected for producing a power output level indication having a value associated with each measuring interval by a digital operation in which the indication value associated with a preceding time interval is altered according to a function of the representation produced by said detecting means for the present measuring interval,
   wherein said digital means comprises: means for determining the difference between the value of the representation produced for the present measuring interval and the value of the power output level indication associated with a preceding measuring interval; means connected for providing a selected multiplying factor having a value less than unity; means connected for forming a representation of the value of the product of the difference determined by said means for determining and the selected multiplying factor; and means connected for adding the product value representation to the power output level indication associated with the preceding measuring interval in order to produce the power output level indication associated with the present interval.

9. A device as defined in claim 8 wherein said means for providing a selected multiplying factor comprises means for giving the multiplying factor a value inversely proportional to at least the value of the power output level indication associated with a preceding measuring interval.

10. A device as defined in claim 9 wherein the value of the multiplying factor is inversely proportional to the sum of value of the power output level indication associated with the proceeding measuring interval and the value of the representation produced for the present measuring interval.

11. A device as defined in claim 10 further comprising means for generating a reactor power output level rate of change indication having value associated with each measuring interval, said means for generating comprising: first calculating means for deriving, during each measuring interval, a power level change representation having a value which is a function of the difference between the values of the power output level indications associated with the present measuring interval and with a preceding measuring interval; and second calculating means connected to said first calculating means for producing a reactor power output level rate of change indication having a value associated with each measuring interval by modifying the rate of change indication value associated with a preceding measuring interval according to a function of the power level change representation value associated wit the present measuring interval.

12. A device as defined in claim 11 wherein the function of the difference between the values is the difference between the logs of the values of the power output level indications, divided by the duration of one measuring interval.

13. A device as defined in claim 8 further comprising means for generating a reactor power output level rate of change indication having value associated with each measuring interval, said means for generating comprising: first calculating means for deriving, during each measuring interval, a power level change representation having a value which is a function of the difference between the values of the power output level indications associated with the present measuring interval and with a preceding measuring interval; and second calculating means connected to said first calculating means for producing a reactor power output level rate of change indication having a value associated with each measuring interval by modifying the rate of change indication value associated with a preceding measuring interval according to a function of the power level change representation value associated wit the present measuring 14. A device as defined in claim 13 wherein the function of the difference between the values is the difference between the logs of the values of the power output level indications, divided by the duration of one measuring interval.

* * * * *